United States Patent [19]
Nakayama

[11] Patent Number: 5,583,699
[45] Date of Patent: Dec. 10, 1996

[54] REAR-FOCUS ZOOM LENS SYSTEM

[75] Inventor: Hiroki Nakayama, Sagamihara, Japan

[73] Assignee: Canon Kabushiki Kaisha, Tokyo, Japan

[21] Appl. No.: 376,285

[22] Filed: Jan. 23, 1995

Related U.S. Application Data

[63] Continuation of Ser. No. 977,024, Nov. 16, 1992, abandoned.

[30] Foreign Application Priority Data

Nov. 27, 1991 [JP] Japan ..................... 3-312551

[51] Int. Cl.⁶ .................................................. G02B 15/14
[52] U.S. Cl. ........................................... 357/687; 357/684
[58] Field of Search ................................ 359/687, 684, 359/774

[56] References Cited

U.S. PATENT DOCUMENTS

| | | |
|---|---|---|
| 4,776,679 | 10/1988 | Kitagishi et al. . |
| 4,842,386 | 6/1989 | Kitagishi et al. . |
| 5,078,481 | 1/1992 | Nakayama et al. . |
| 5,111,338 | 5/1992 | Nakayama . |

FOREIGN PATENT DOCUMENTS

| | | |
|---|---|---|
| 87024213 | 2/1987 | Japan . |
| 62-215225 | 9/1987 | Japan . |

*Primary Examiner*—Georgia Y. Epps
*Assistant Examiner*—Michael A. Papalas
*Attorney, Agent, or Firm*—Fitzpatrick, Cella, Harper & Scinto

[57] ABSTRACT

A rear-focus zoom lens system with four lens group. A stationary first lens group of a positive refractive power; a second lens group of a negative refractive power that moves for zooming; a stationary third lens group of a positive refractive power; a fourth lens group of a positive refractive power that moves for zooming and focusing. The first through fourth lens groups are arranged in that order from the object side. This zoom lens system also satisfies the following conditional expression:

$$3.7 < f_4/fw < 6$$

wherein $f_4$ is the focal length of the fourth lens group and fw is the focal length of the zoom lens system at the wide-angle end.

14 Claims, 8 Drawing Sheets

REAR-FOCUS ZOOM LENS SYSTEM

This application is a continuation of application Ser. No. 07/977,024 filed Nov. 16, 1992, now abandoned.

BACKGROUND OF THE INVENTION

1. Field of the Invention

The present invention relates to a rear-focus zoom lens system with a variable power ratio of about 12 and a brightness, or F value, approximately in the range from 1.6 to 1.8 and, more particularly, to a compact-size high variable power zoom lens system having a large view angle, i.e., 65° or greater. This zoom lens system is useful for a video camera or a still camera.

2. Description of the Related Art

As the size and weight of video cameras and still cameras are being reduced, there is a growing need for smaller and lighter lenses. In response to this need, a variety of systems have been proposed. Some of the systems use the conventional, and so-called front lens focus method, which performs focusing by moving the first lens group, the first lens group being the closest to an object and larger than the other lens groups. Some other systems use a so-called rear focus method, which performs focusing by moving a lens group other than the first lens group.

Generally, because a zoom lens system of the rear focus type moves a relatively small and light-weight lens group to perform focusing, that method reduces the required driving force and provides for a speedy focusing.

For example, the assignee of the present invention has proposed, in Japanese Patent Applications Laid-Open Nos. 62-24213 and 62-215225, a zoom lens system of the rear focus type which comprises: a stationary first lens group; a movable second lens group for varying the magnification; a stationary third lens group having a positive refractive power; and a movable fourth lens group having a positive refractive power. In that combination, the second lens group moves to vary magnifications and the fourth lens group moves to compensate for changes in the image field caused by magnification variations and also to perform focusing.

In order to reduce the size of the first lens group, in both a front lens focus type and a rear focus type, the focal length at the wide-angle end (which determines the size of the first lens group) typically is made as close to the telephoto end as possible. Therefore, in most lens systems of these types, the view angle at the wide-angle end is generally 50° or so. A lens system having a view angle of the wide-angle end greater than 50° inevitably has required a complicated lens system, which would not meet the need for a compact size.

To obtain a view angle of 65° or greater in a video camera, either a wide angle converter lens or a wide angle attachment lens typically has been attached in front of the lens system, which is a troublesome operation.

SUMMARY OF THE INVENTION

Accordingly, an object of the present invention is to provide an improved rear-focus zoom lens system which has a view angle at the wide-angle end of 65° or greater and a high variable power ratio and achieves good optical performance.

This rear-focus lens system has a first lens group having a positive refractive power that remains fixed during zooming; a second lens group having a negative refractive power that moves for zooming; a third lens group having a positive refractive power that remains fixed during zooming; and a fourth lens group of positive refractive power that moves for zooming and focusing. The first through fourth lens groups are arranged in that order from the object side. This zoom lens system also satisfies the following conditional expression:

$$3.7 < f_4/fw < 6$$

wherein $f_4$ is the focal length of the fourth lens group and fw is the focal length of the zoom lens system at the wide-angle end.

Further objects, features and advantages of the present invention will become apparent from the following description of the preferred embodiments with reference to the attached drawings.

Figure 1A:
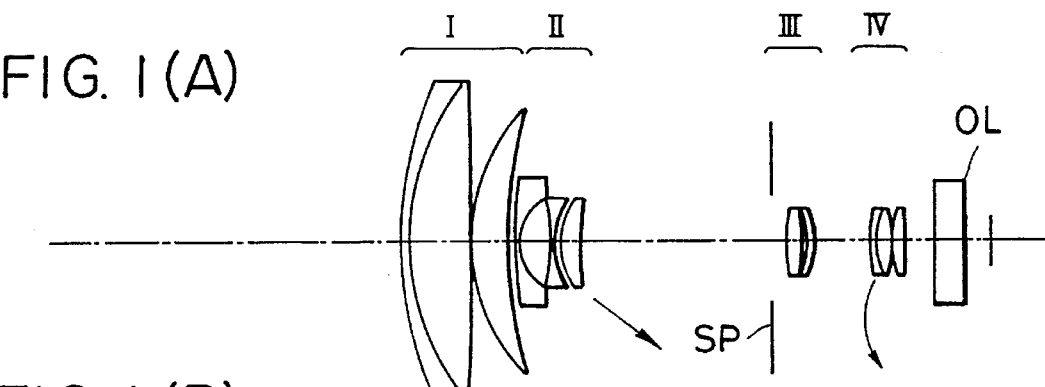
FIG. 1 shows a sectional view of a lens system and the aberrations thereof, according to a first embodiment of the present invention.
Figure 1B:
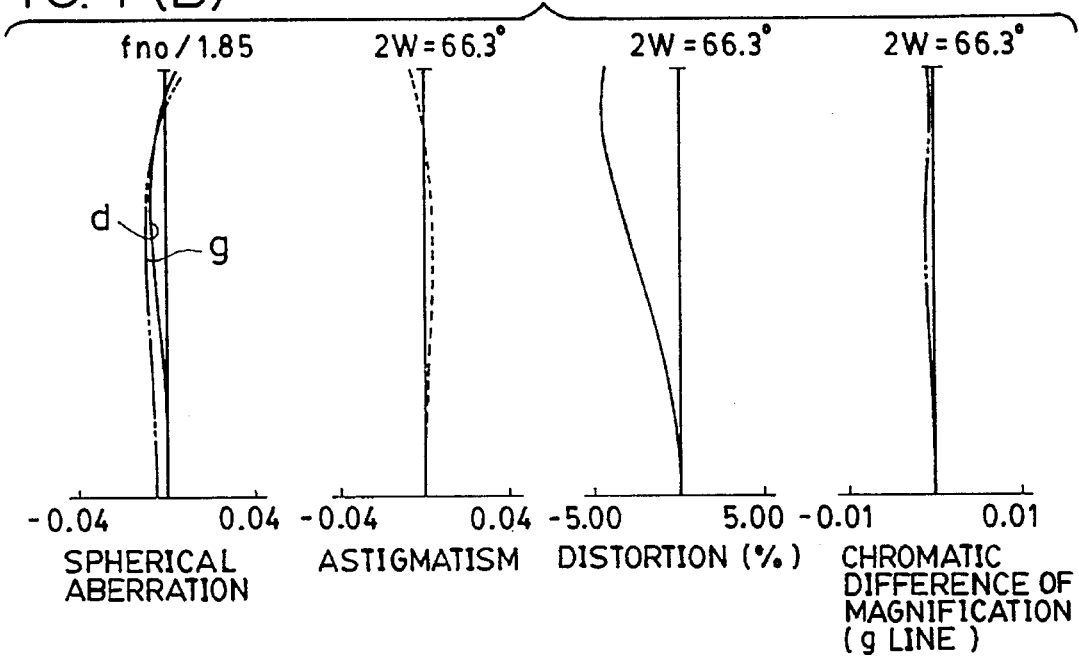
Figure 1C:
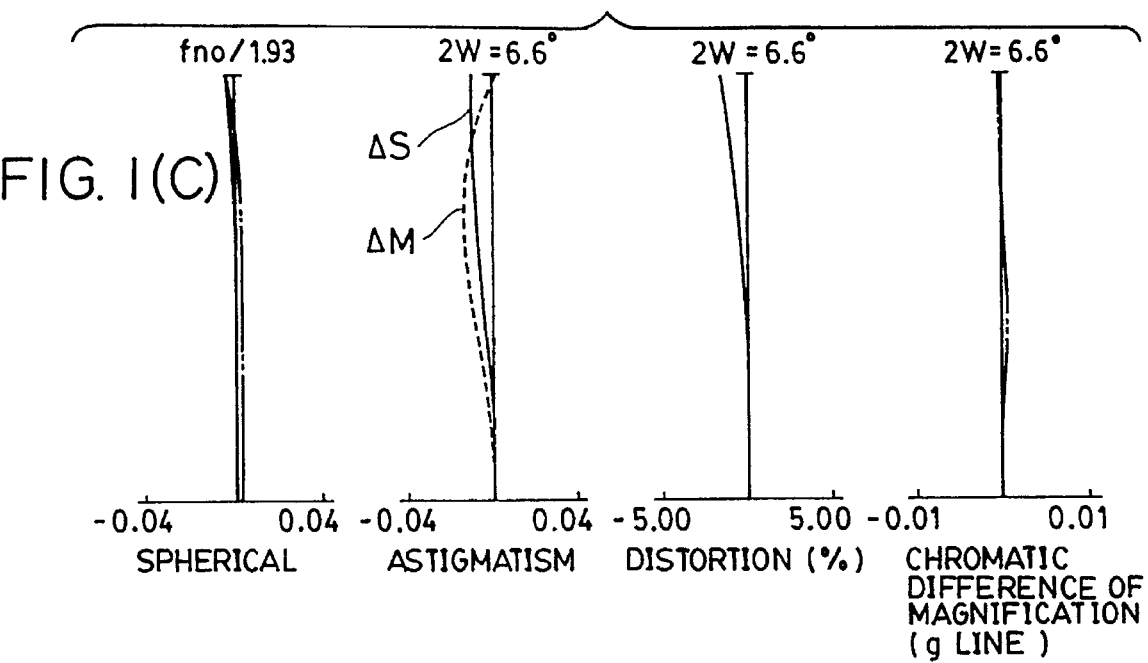
Figure 2A:
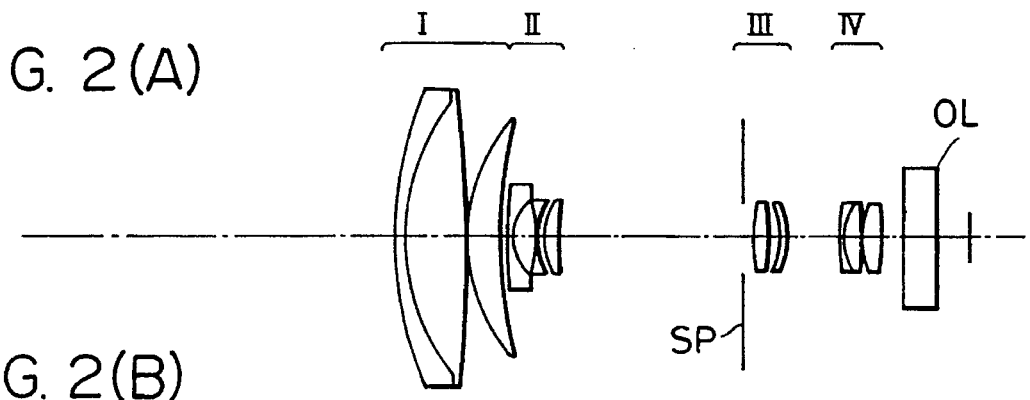
FIG. 2 shows a sectional view of a lens system and the aberrations thereof, according to a second embodiment of the present invention.
Figure 2B:
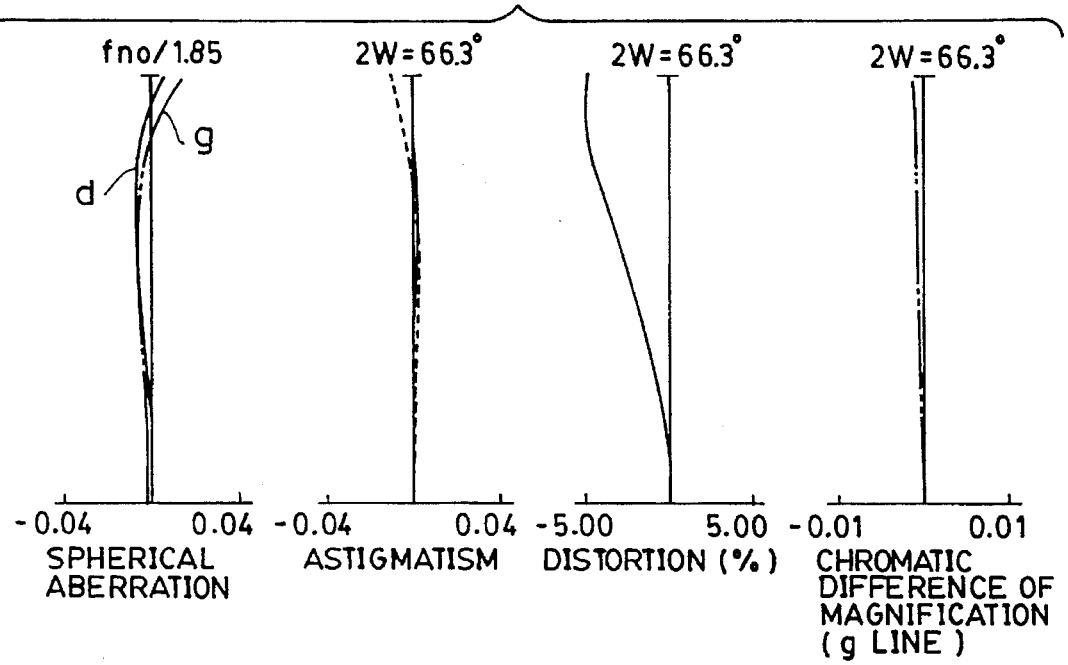
Figure 2C:
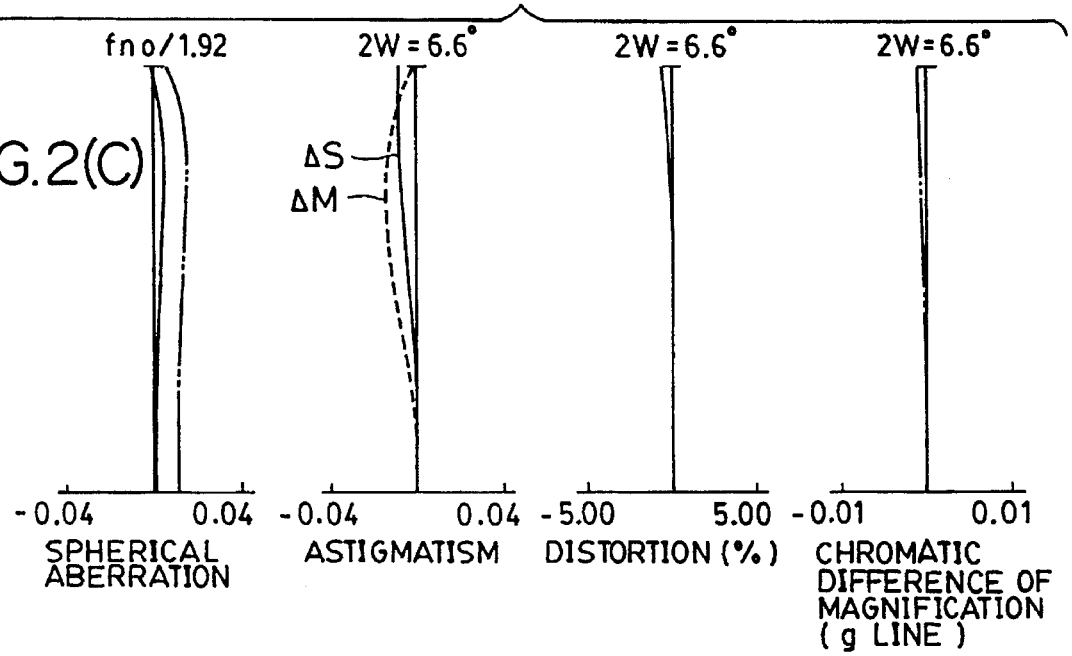
Figure 3A:
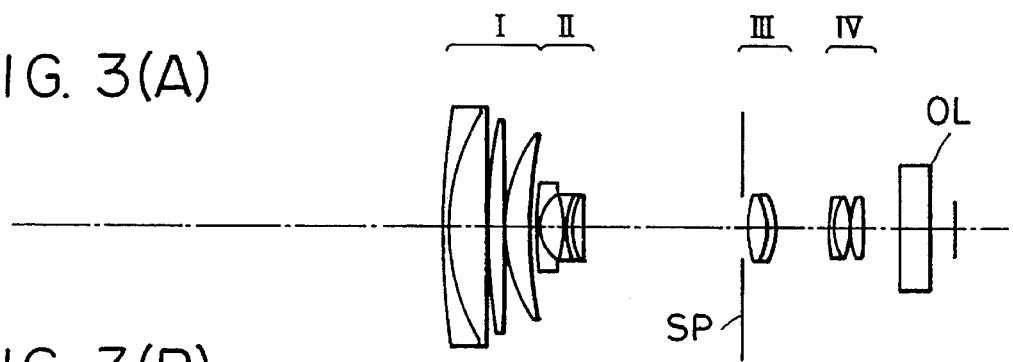
FIG. 3 shows a sectional view of a lens system and the aberrations thereof, according to a third embodiment of the present invention.
Figure 3B:
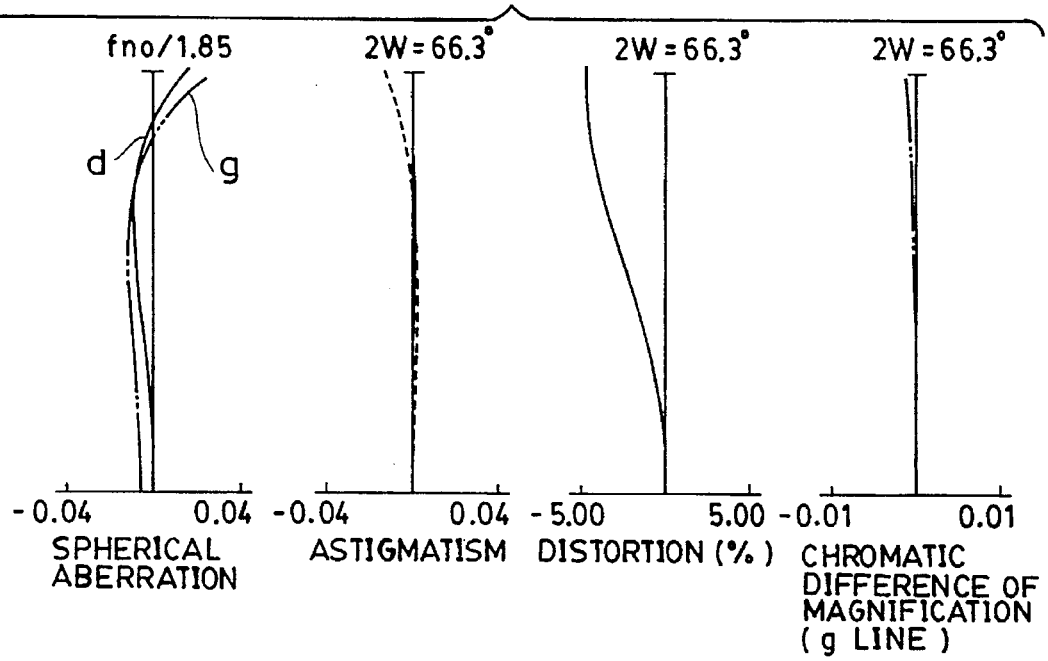
Figure 3C:
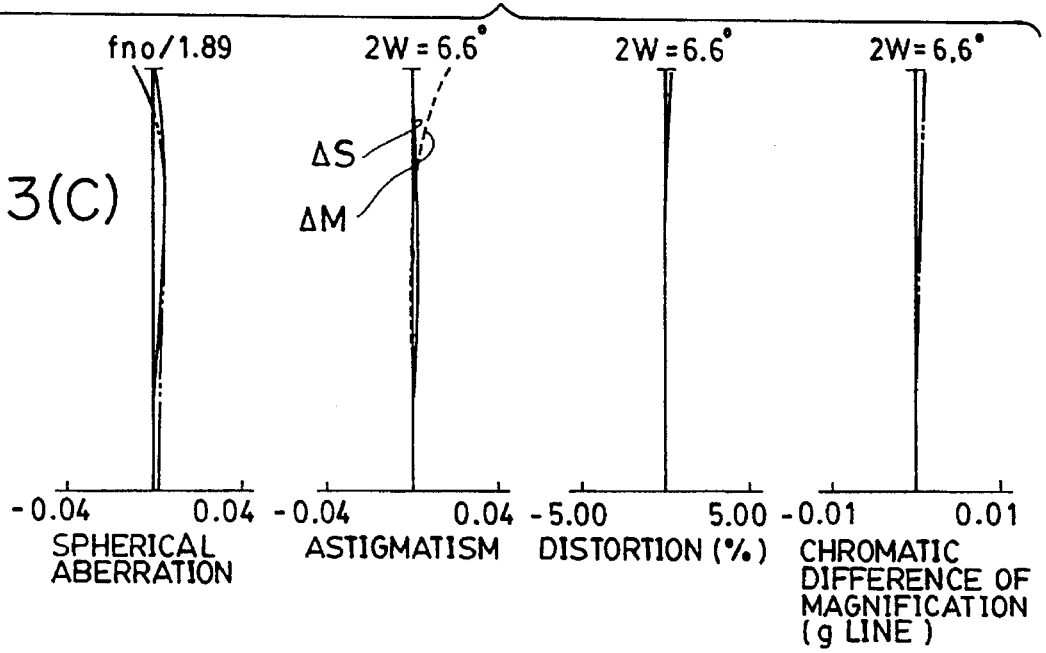
Figure 4A:
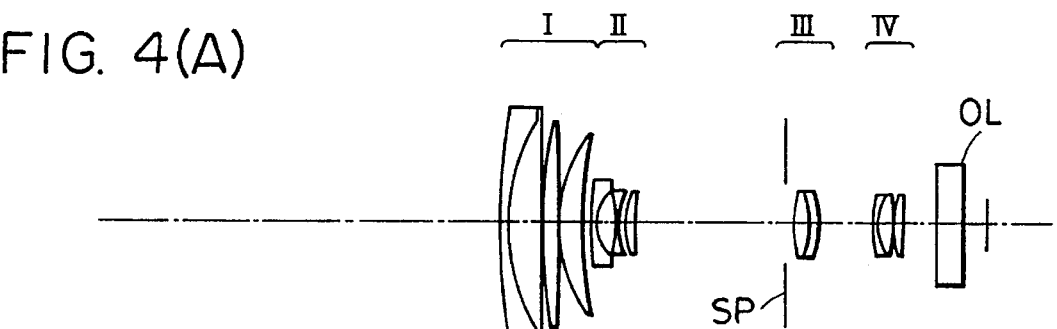
FIG. 4 shows a sectional view of a lens system and the aberrations thereof, according to a fourth embodiment of the present invention.
Figure 4B:
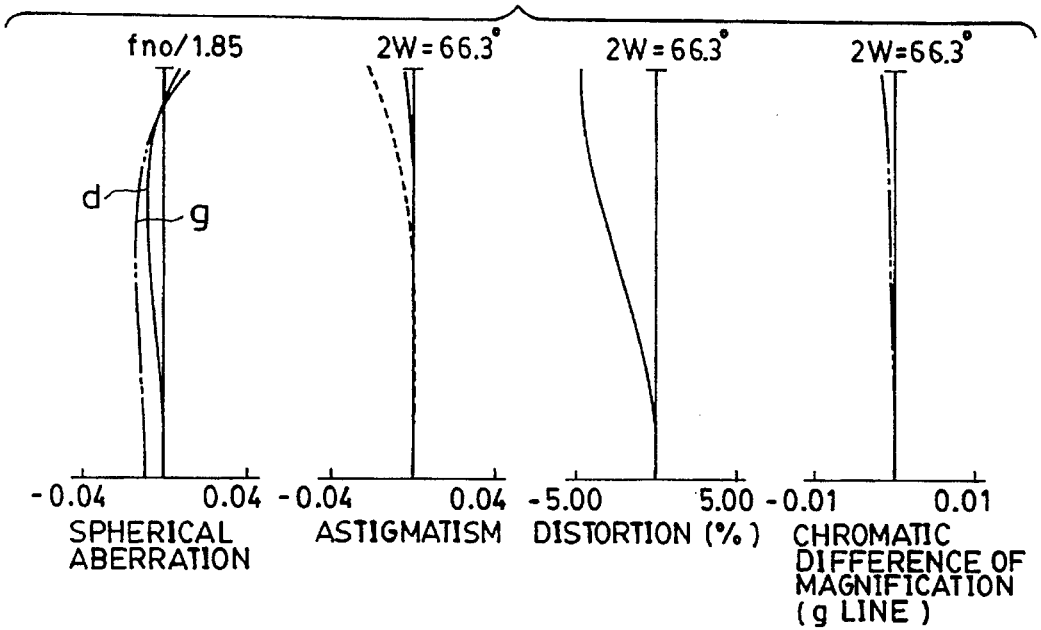
Figure 4C:
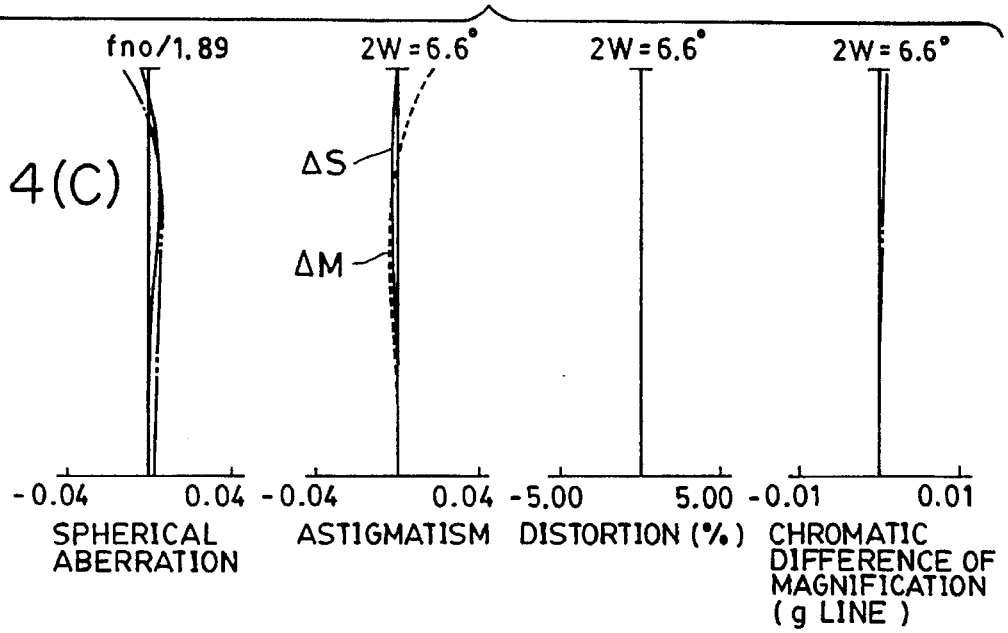
Figure 5A:
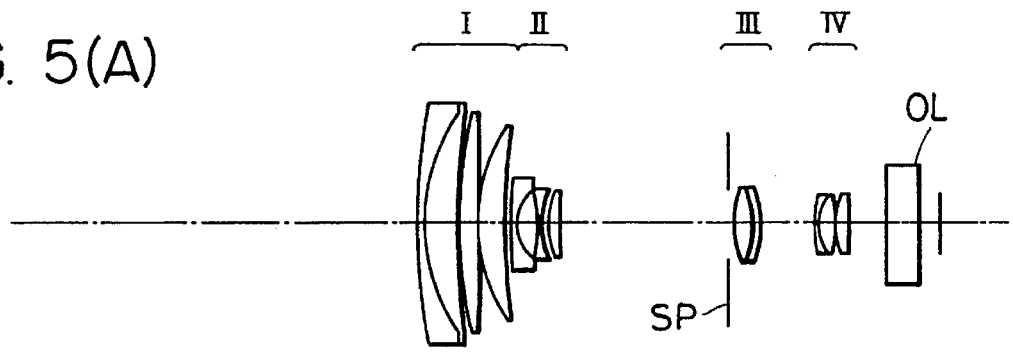
FIG. 5 shows a sectional view of a lens system and the aberrations thereof, according to a fifth embodiment of the present invention.
Figure 5B:
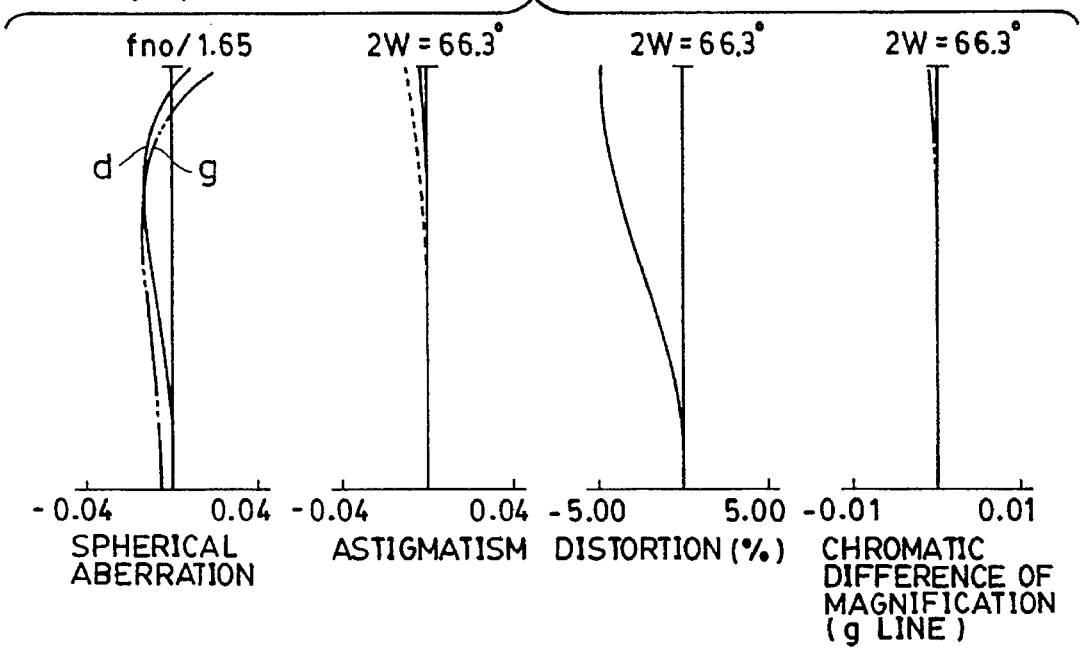
Figure 5C:
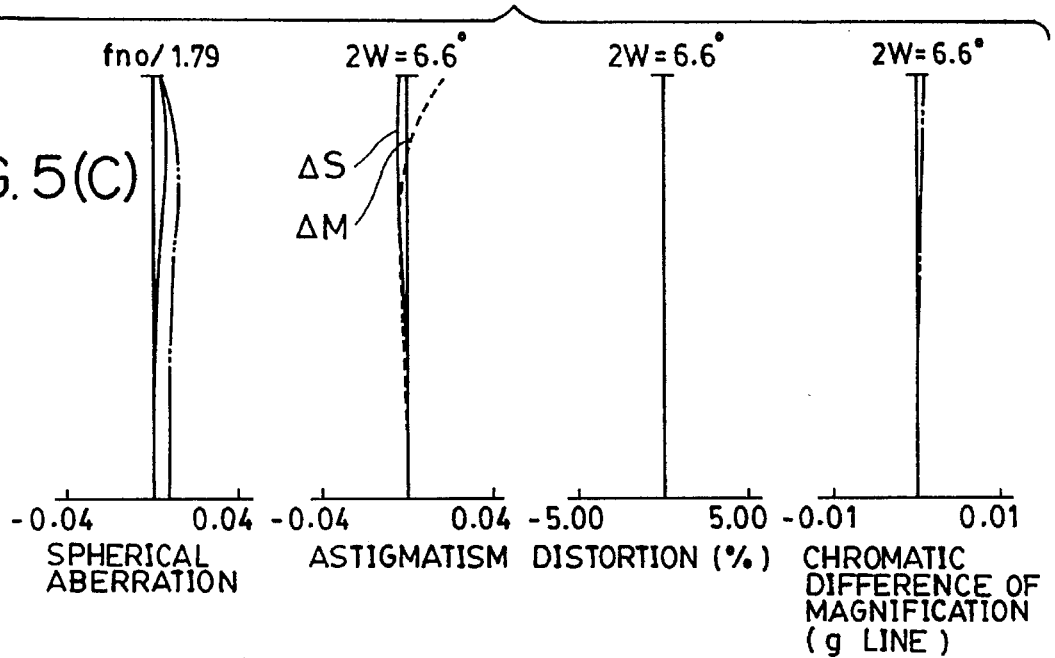
Figure 6:
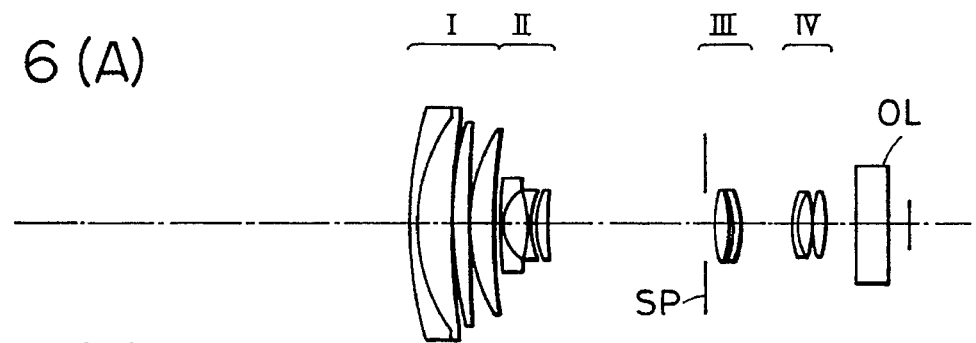
FIG. 6 shows a sectional view of a lens system and the aberrations thereof, according to a sixth embodiment of the present invention.
Figure 6:
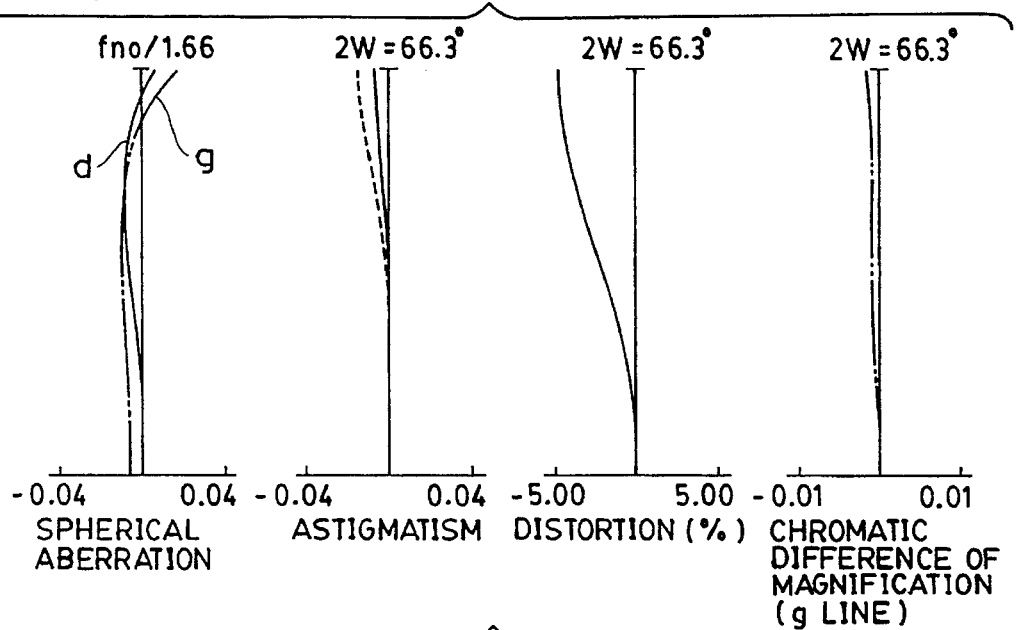
Figure 6:
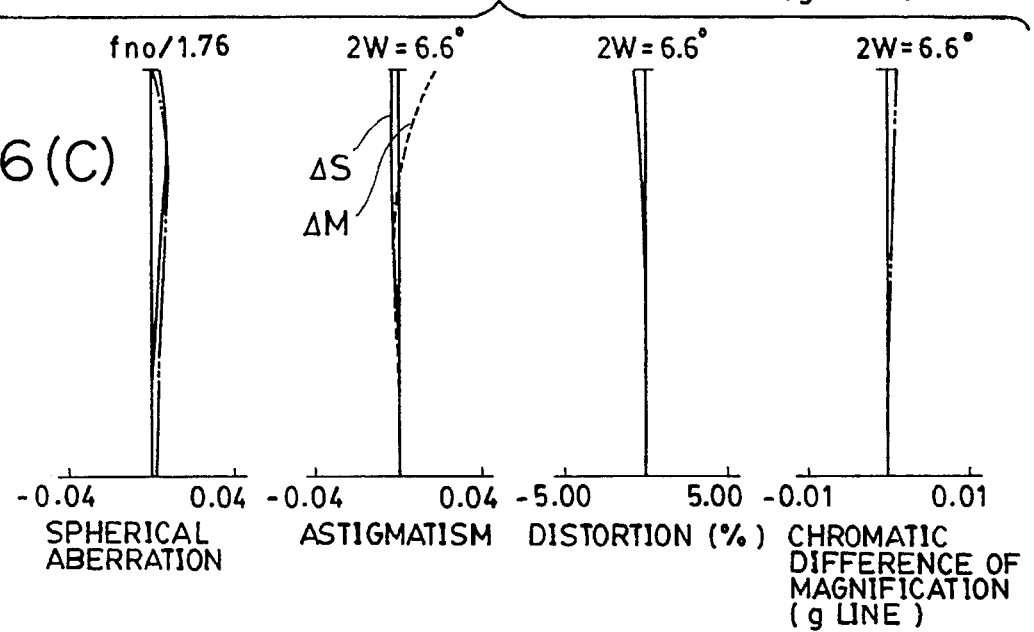
Figure 7A:
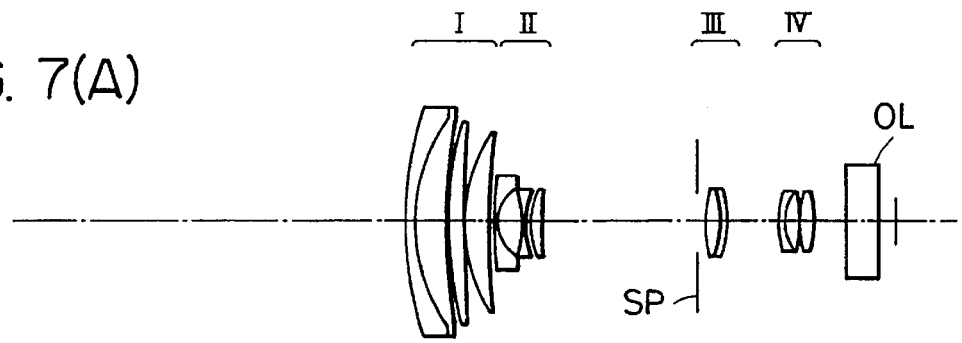
FIG. 7 shows a sectional view of a lens system and the aberrations thereof, according to a seventh embodiment of the present invention.
Figure 7B:
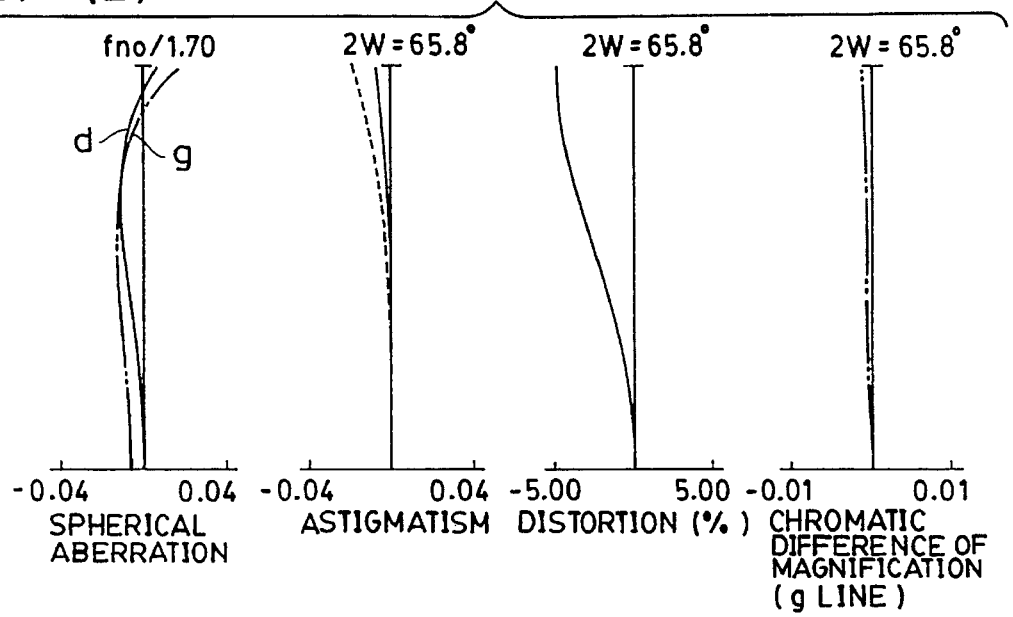
Figure 7C:
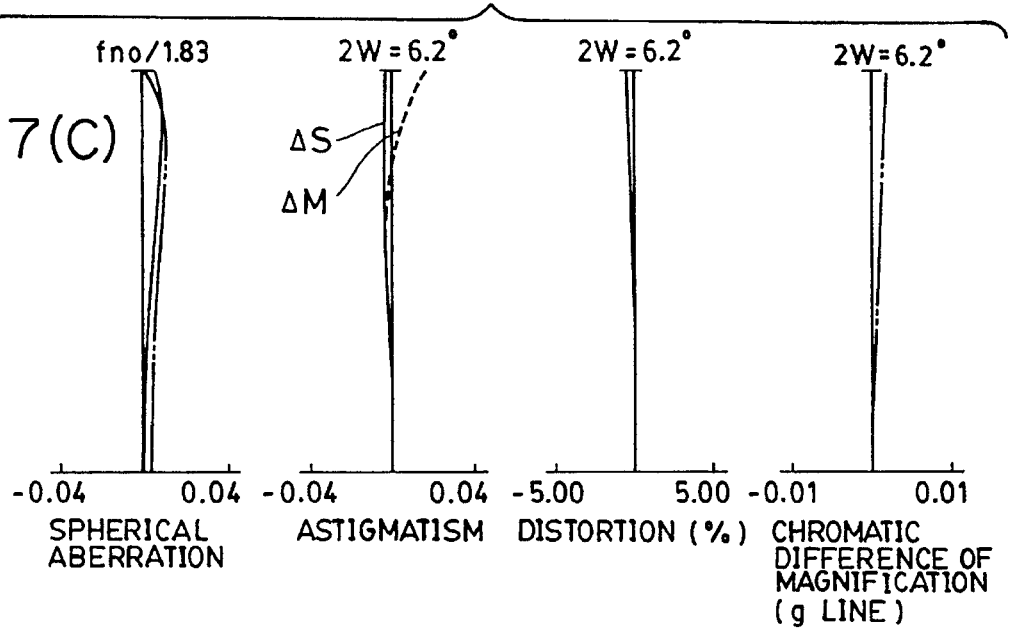
Figure 8A:
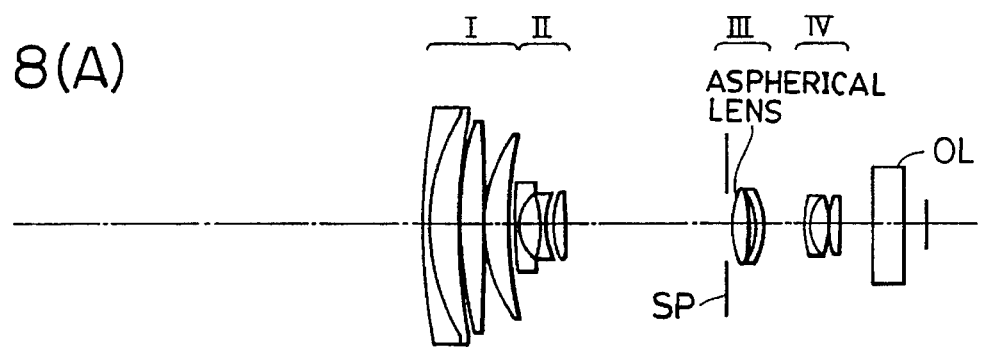
FIG. 8 shows a sectional view of a lens system and the aberrations thereof, according to an eighth embodiment of the present invention.
Figure 8B:
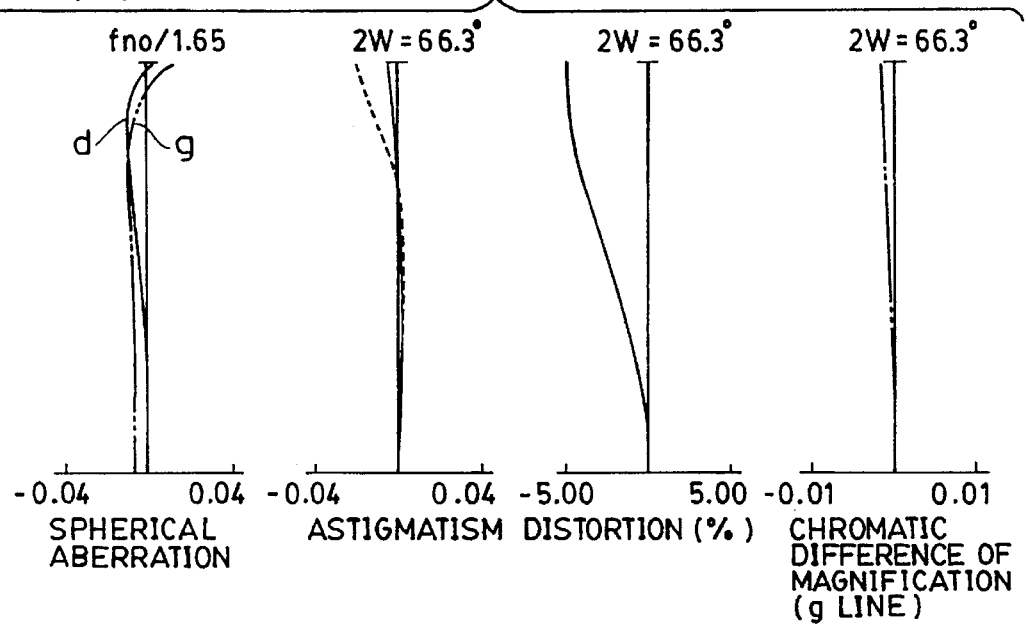
Figure 8C:
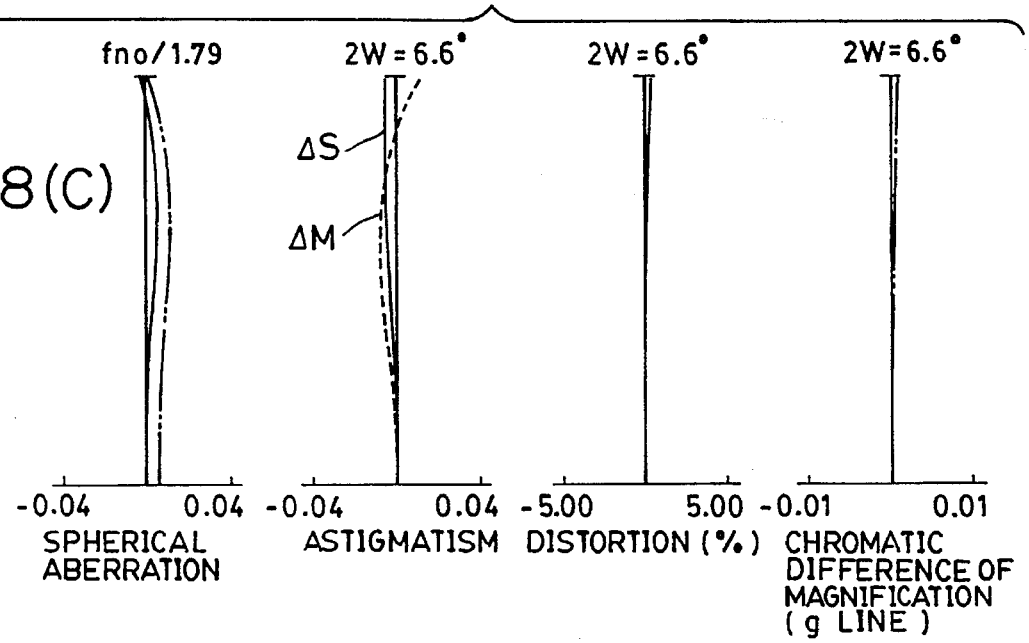

The section (A) of each figure shows a sectional view of the lens system, and the sections (B) and (C) of each figure show the aberrations at the wide-angle end and the aberrations at the telephoto end, respectively.

DESCRIPTION OF THE PREFERRED EMBODIMENTS

Zoom lens systems according to the preferred embodiments of the present invention will be described hereinafter, with reference to the accompanying drawings.

Referring to section (A) of each figure, a lens system according to the present invention comprises: a first lens group I having a positive refractive power, a second lens group II having a negative refractive power, a third lens group III having a positive refractive power, a fourth lens group IV having a positive refractive power, and a stop SP. These groups are arranged in that order from the object side. The first and third lens groups I, III are fixed in position. The second and fourth lens groups II, IV are movable for zooming, and the fourth lens group IV also is movable for focusing.

In order to obtain a large view angle at the wide-angle end, of about 65° or greater, while still reducing the total length of the lens system and achieving good aberration correction, the zoom lens system satisfies the following conditional expression:

$$3.7 < f_4/fw < 6 \quad (1)$$

wherein $f_4$ is the focal length of the fourth lens group and fw is the focal length of the entire lens system at a wide-angle end.

The conditional expression (1) defines the focal length of the fourth lens group. If this expression is satisfied, both a short length of the lens system and small changes in the aberrations caused by a displacement of the fourth lens group for focusing will be achieved. The light incident on the fourth lens group is made substantially afocal by the lens groups in front thereof. If $f_4/fw$ is 6 or greater, the length of the lens system becomes unacceptably large. If $f_4/fw$ is 3.7 or less, changes in aberrations caused by a displacement of the fourth lens group for focusing becomes unacceptably large, and it will be difficult to achieve good optical performance over the entire range of object distances.

Preferably, the zoom lens system also should satisfy the following conditional expressions:

$$2.8 < |M_2/f_2| < 5 \quad (2)$$

$$7 < f_1/fw < 15 \quad (3)$$

wherein M2 is a displacement of the second lens group when the zoom lens moves from the wide-angle end to the telephoto end, and fi is the focal length of the ith lens group.

The conditional expression (2) states the conditions for achieving an appropriately high variable power ratio while retaining good optical performance. If $|M_2/f_2|$ is 5 or greater, the displacement of the second lens group is too large to achieve a compact lens system, or the focal length of the second lens group is unfavorably small so that the Petzval's sum becomes too large in negative numbers and the image field becomes overly large. If $|M_2/f_2|$ is 2.8 or less, it will be difficult to obtain the high variable power ratio zoom lens that is desired.

The conditional expression (3) states the conditions for mitigating aberrations, particularly comatic aberration, so as to achieve good imaging over the entire range of zoom lens variable powers. If $f_1/fw$ is 15 or greater, a good view angle characteristic can be obtained and the changes in the aberrations, such as comatic aberration, can be mitigated. However, the diameter of the first lens group must be made substantially large in order to achieve a wide view angle of 65° or greater, which is undesirable for achieving a compact lens system. If $f_1/fw$ is 7 or less, the light fluxes around the lenses near the wide-angle end will cause an outgoing coma and, therefore, large changes in the aberrations.

The conditional expression (3) states the conditions for achieving an appropriate balance between a wider view angle and a smaller size of the lens system. To make the balance more appropriate, i.e., to achieve a more advantageous zoom lens system, the range of $f_1/fw$ may be narrowed as follows:

$$8 < f_1/fw < 12$$

As mentioned above, the outside diameter of the first lens group must be made large in order to achieve a wide view angle. To provide a sufficiently thick peripheral portion in a positive lens of the first lens group having a large diameter, the positive lens must have a substantially thick central portion, which makes the production of the lens difficult. To avoid such a problem, the first lens group should preferably be composed of two positive lens and a combined lens made of a positive lens and a negative lens.

Further, to enhance the optical performance of the central portion of the lens system, the third lens group should preferably comprise an aspherical lens, which reduces spherical aberration and helps achieve a larger maximum aperture, and lower F number.

To fully achieve the objects of the present invention, the following conditional expressions also should preferably be satisfied.

$$4.0 < |f_1/f_2| < 10.0 \quad (4)$$

$$1.55 < |f_1/fw| < 1.8 \quad (5)$$

$$1.0 < f_1/M_2 < 1.85 \quad (6)$$

$$1.0 < z/z_2 < 1.5 \quad (7)$$

$$1.65 < z_3/z_4 < 4.0 \quad (8)$$

wherein $z_i$ is the ratio between the magnifications at the wide-angle end and the telephoto end in the ith lens group (the ratio between paraxial lateral magnifications); and z is $f_T/fw$ ($f_T$ representing the focal length of the entire lens system at the telephoto end).

The conditional expressions (4) to (6) state the conditions that help to achieve a small lens system as well as good optical performance.

If the conditional expression (4) is satisfied, smooth magnification changing and reduced comatic aberration can be achieved in a small lens system. If $|f_1/f_2|$ is 10.0 or greater, the comatic aberration near the wide-angle end is reduced. However, the lens system then inevitably becomes large, and changes in the aberrations, particularly a change in the curvature of image field, caused by zooming will become large. If $|f_1/f_2|$ is 4.0 or less, the entire zoom lens system must be made quite large, in most cases, in order to achieve the desired high variable power ratio.

If the conditional expression (5) is satisfied, Petzval's sum is mitigated in the second lens group, which is the main variable-power lens system. If $|f_1/fw|$ is out of the defined range, a substantial curvature of the image field will likely result, and thus good imaging will become hard to achieve.

The conditional expression (6) states a condition which defines the displacements of the second lens group, i.e., the main variable-power lens system that is moved for zooming. If this conditional expression is satisfied, a reduced diameter of the first lens group is achieved and the occurrence of comatic aberration is suppressed. If $f_1/M_2$ is 1.85 or greater, the diameter of the front lens becomes unacceptably large. If $f_1/M_2$ is 1.0 or less, the comatic aberration, particularly near the wide-angle end, becomes large.

If the conditional expressions (7) and (8) are satisfied, an appropriate balance among the variable powers of the lens groups, as well as good optical performance, can be achieved in a small lens system. If $z/z_2$ and/or $z_3/z_4$ are out of the respective ranges, good optical performance cannot be achieved. Further, the size of the lens system or changes in the image field caused by variable power becomes unacceptably large.

In a preferred zoom lens system according to the present invention, the first lens group consists of a combined lens made of negative and positive lenses and one or two positive lenses placed behind the combined lens; the second lens group consists of a negative meniscus lens having a substantially concave surface toward the image side, and a biconcave lens and a positive lens having a concave surface toward the image side. These lenses are arranged in that order, from the object side. The third lens group consists of at least one positive lens and at least one negative lens.

Further, the third lens group should preferably be composed of a biconvex positive lens and a negative lens having a concave surface toward the object side, which also are arranged in that order from the object side. The above-mentioned aspherical surface should preferably be present on this biconvex lens for an advantageous correction of spherical aberration.

The fourth lens group should preferably consist of at least one positive lens and at least one negative lens. Since the light incident on the fourth lens is substantially afocal in most cases, the focal length of the fourth lens group should preferably be arranged symmetrically to the focal length of the third lens group. More preferably, the fourth lens group should consist of a negative meniscus lens having its concave surface toward the image side and one or two positive lenses, which are arranged in that order from the object side. Such a fourth lens group provides a good focusing characteristic.

The preferred embodiments of the present invention will be described below, by showing numerical values of various lens factors. In the examples: $r_i$ is the radius of curvature of the lens surface located in the ith position in order from the object side; $d_i$ is the thickness of the ith glass or air lens in order from the object side; $n_i$ is the refractance of the ith glass lens in order from the object side; and $v_i$ is the Abbe number of the ith glass lens.

If the X axis is assumed along the optical axis; the Y axis is assumed perpendicular to the optical axis; and the origin is assumed on the intersecting point between the X axis and a straight line passing the apexes of the lens, the aspherical surface is expressed as follows:

$$X=\{(1/R)Y^2/(1+\sqrt{1-(Y/R)^2}\}+a_1Y^2+a_2Y^4+a_3Y^{16}+a_4Y^8+a_5Y^{10}+b_1Y^3+b_2Y^5+b_3Y^7+b_4Y^9$$

where: R is the paraxial radius of curvature of the lens surface; $a_1$, $a_2$, $a_3$, $a_4$, $a_5$, $b_1$, $b_2$, $b_3$, and $b_4$ each are coefficients of the aspherical surface.

In the below expressions showing the values $a_1$ to $a_5$, $D_{-03}$, for example, means $10^{-3}$.

Parallel flat glass plate typically is placed at the very front, i.e., the side closest to an object, as a face plate, filter or the like.

The figures corresponding to the above conditional expressions are shown in Table 1 below.

Embodiment 1
f = 1 to 11.41   fno = 1:1.85 to 1.93   2w = 66.3° to 6.6°

| | | | |
|---|---|---|---|
| r 1 = 12.2800 | d 1 = 0.3061 | n 1 = 1.84666 | v 1 = 23.8 |
| r 2 = 7.4755 | d 2 = 2.1409 | n 2 = 1.51633 | v 2 = 64.2 |
| r 3 = −198.4315 | d 3 = 0.0408 | | |
| r 4 = 6.6504 | d 4 = 1.2589 | n 3 = 1.69680 | v 3 = 55.5 |
| r 5 = 16.3819 | d 5 = variable | | |
| r 6 = 12.8170 | d 6 = 0.1633 | n 4 = 1.77250 | v 4 = 49.6 |
| r 7 = 1.8119 | d 7 = 1.0857 | | |
| r 8 = −6.6579 | d 8 = 0.1429 | n 5 = 1.69680 | v 5 = 55.5 |
| r 9 = 2.6709 | d 9 = 0.2500 | | |
| r10 = 2.9732 | d10 = 0.6710 | n 6 = 1.84666 | v 6 = 23.8 |
| r11 = 10.4334 | d11 = variable | | |
| r12 = (stop) | d12 = 0.3673 | | |
| r13 = 5.0973 | d13 = 0.6077 | n 7 = 1.69680 | v 7 = 55.5 |
| r14 = −6.6462 | d14 = 0.1442 | | |
| r15 = −3.0100 | d15 = 0.2041 | n 8 = 1.68893 | v 8 = 31.1 |
| r16 = −4.0610 | d16 = variable | | |
| r17 = 6.2677 | d17 = 0.1633 | n 9 = 1.78472 | v 9 = 25.7 |
| r18 = 2.1426 | d18 = 0.5836 | n10 = 1.51633 | v10 = 64.2 |
| r19 = −10.4932 | d19 = 0.0306 | | |
| r20 = 3.6185 | d20 = 0.4724 | n11 = 1.51633 | v11 = 64.2 |
| r21 = −14.8477 | d21 = variable | | |
| r22 = ∞ | d22 = 1.0204 | n12 = 1.51633 | v12 = 64.2 |
| r23 = ∞ | | | |

Variable Thicknesses of Air Lenses

| | Focal Lengths | | |
|---|---|---|---|
| | W | M | T |
| Air Lenses | 1.00 | 1.81 | 11.41 |
| d 5 | 0.21 | 2.44 | 6.42 |
| d11 | 6.73 | 4.49 | 0.52 |
| d16 | 1.94 | 1.58 | 1.37 |
| d21 | 1.02 | 1.38 | 1.59 |

Embodiment 2
f = 1 to 11.41   fno = 1:1.85 to 1.92   2w = 66.3° to 6.6°

| | | | |
|---|---|---|---|
| r 1 = 12.8564 | d 1 = 0.3061 | n 1 = 1.84666 | v 1 = 23.8 |
| r 2 = 7.2757 | d 2 = 2.0610 | n 2 = 1.51633 | v 2 = 64.2 |
| r 3 = −58.2980 | d 3 = 0.0408 | | |
| r 4 = 6.2666 | d 4 = 1.1215 | n 3 = 1.69680 | v 3 = 55.5 |
| r 5 = 16.7190 | d 5 = variable | | |
| r 6 = 17.3934 | d 6 = 0.1633 | n 4 = 1.77250 | v 4 = 49.6 |
| r 7 = 1.6562 | d 7 = 0.8526 | | |
| r 8 = −5.6964 | d 8 = 0.1429 | n 5 = 1.69680 | v 5 = 55.5 |
| r 9 = 2.7650 | d 9 = 0.2205 | | |
| r10 = 2.9381 | d10 = 0.4612 | n 6 = 1.84666 | v 6 = 23.8 |
| r11 = 10.4334 | d11 = variable | | |
| r12 = (stop) | d12 = 0.3673 | | |
| r13 = 5.1418 | d13 = 0.6262 | n 7 = 1.69680 | v 7 = 55.5 |
| r14 = −5.9596 | d14 = 0.2272 | | |
| r15 = −3.0337 | d15 = 0.2041 | n 8 = 1.68893 | v 8 = 31.1 |
| r16 = −4.4716 | d16 = variable | | |
| r17 = 6.7044 | d17 = 0.1633 | n 9 = 1.78472 | v 9 = 25.7 |
| r18 = 2.1807 | d18 = 0.5904 | n10 = 1.51633 | v10 = 64.2 |
| r19 = −8.6645 | d19 = 0.0306 | | |
| r20 = 3.7745 | d20 = 0.6083 | n11 = 1.51633 | v11 = 64.2 |
| r21 = −12.8287 | d21 = variable | | |
| r22 = ∞ | d22 = 1.0204 | n12 = 1.51633 | v12 = 64.2 |
| r23 = ∞ | | | |

Variable Thicknesses of Air Lenses

| | Focal Lengths | | |
|---|---|---|---|
| | W | M | T |
| Air Lenses | 1.00 | 2.03 | 11.41 |
| d 5 | 0.19 | 2.63 | 6.00 |
| d11 | 6.45 | 4.01 | 0.65 |
| d16 | 1.94 | 1.49 | 1.41 |
| d21 | 1.02 | 1.47 | 1.54 |

Embodiment 3
f = 1 to 11.41   fno = 1:1.85 to 1.89   2w = 66.3° to 6.6°

| | | | |
|---|---|---|---|
| r 1 = 23.4043 | d 1 = 0.3061 | n 1 = 1.84666 | v 1 = 23.8 |
| r 2 = 7.7547 | d 2 = 1.1701 | n 2 = 1.51633 | v 2 = 64.2 |
| r 3 = 87.2489 | d 3 = 0.0408 | | |
| r 4 = 17.5012 | d 4 = 0.6360 | n 3 = 1.72000 | v 3 = 50.3 |
| r 5 = −182.0458 | d 5 = 0.0408 | | |
| r 6 = 5.7152 | d 6 = 0.8453 | n 4 = 1.72000 | v 4 = 50.3 |
| r 7 = 17.1471 | d 7 = variable | | |
| r 8 = 14.2365 | d 8 = 0.1633 | n 5 = 1.77250 | v 5 = 49.6 |
| r 9 = 1.4683 | d 9 = 0.7496 | | |
| r10 = −3.9438 | d10 = 0.1429 | n 6 = 1.69680 | v 6 = 55.5 |
| r11 = 3.1284 | d11 = 0.2050 | | |
| r12 = 3.0315 | d12 = 0.3856 | n 7 = 1.84666 | v 7 = 23.8 |
| r13 = 26.2836 | d13 = variable | | |

| | | | |
|---|---|---|---|
| r14 = (stop) | d14 = 0.2449 | | |
| r15 = 4.2460 | d15 = 0.5749 | n 8 = 1.58267 | v 8 = 46.4 |
| r16 = −4.2460 | d16 = 0.0963 | | |
| r17 = −2.6769 | d17 = 0.2041 | n 9 = 1.68893 | v 9 = 31.1 |
| r18 = −4.0729 | d18 = variable | | |
| r19 = 5.8421 | d19 = 0.1633 | n10 = 1.84666 | v10 = 23.8 |
| r20 = 2.1729 | d20 = 0.5658 | n11 = 1.51633 | v11 = 64.2 |
| r21 = −6.1810 | d21 = 0.0306 | | |
| r22 = 3.6317 | d22 = 0.4249 | n12 = 1.48749 | v12 = 70.2 |
| r23 = −19.4285 | d23 = variable | | |
| r24 = ∞ | d24 = 1.0204 | n13 = 1.51633 | v13 = 64.2 |
| r25 = ∞ | | | |

Variable Thicknesses of Air Lenses

| | Focal Lengths | | |
|---|---|---|---|
| Air Lenses | W 1.00 | M 3.11 | T 11.41 |
| d 7 | 0.23 | 3.27 | 5.30 |
| d13 | 5.49 | 2.45 | 0.43 |
| d18 | 1.99 | 1.30 | 1.72 |
| d23 | 1.02 | 1.71 | 1.30 |

Embodiment 4
f = 1 to 11.41   fno = 1:1.85 to 1.89   2w = 66.3° to 6.6°

| | | | |
|---|---|---|---|
| r 1 = 23.1130 | d 1 = 0.3061 | n 1 = 1.84666 | v 1 = 23.8 |
| r 2 = 7.7360 | d 2 = 1.1641 | n 2 = 1.51633 | v 2 = 64.2 |
| r 3 = 83.1025 | d 3 = 0.0408 | | |
| r 4 = 17.3968 | d 4 = 0.6300 | n 3 = 1.72000 | v 3 = 50.3 |
| r 5 = −212.2231 | d 5 = 0.0408 | | |
| r 6 = 5.6836 | d 6 = 0.8489 | n 4 = 1.72000 | v 4 = 50.3 |
| r 7 = 16.7357 | d 7 = variable | | |
| r 8 = 13.5151 | d 8 = 0.1633 | n 5 = 1.77250 | v 5 = 49.6 |
| r 9 = 1.4751 | d 9 = 0.7513 | | |
| r10 = −4.0496 | d10 = 0.1429 | n 6 = 1.69680 | v 6 = 55.5 |
| r11 = 3.0691 | d11 = 0.2044 | | |
| r12 = 3.0462 | d12 = 0.4043 | n 7 = 1.84666 | v 7 = 23.8 |
| r13 = 21.0780 | d13 = variable | | |
| r14 = (stop) | d14 = 0.2449 | | |
| r15 = 4.6349 | d15 = 0.5607 | n 8 = 1.66672 | v 8 = 48.3 |
| r16 = −4.6349 | d16 = 0.0851 | | |
| r17 = −2.9879 | d17 = 0.2041 | n 9 = 1.68893 | v 9 = 31.1 |
| r18 = −5.1198 | d18 = variable | | |
| r19 = 4.2375 | d19 = 0.1633 | n10 = 1.84666 | v10 = 23.8 |
| r20 = 1.9591 | d20 = 0.5711 | n11 = 1.51633 | v11 = 64.2 |
| r21 = −10.7492 | d21 = 0.0306 | | |
| r22 = 3.8768 | d22 = 0.4255 | n12 = 1.48749 | v12 = 70.2 |
| r23 = −14.1764 | d23 = variable | | |
| r24 = ∞ | d24 = 1.0204 | n13 = 1.51633 | v13 = 64.2 |
| r25 = ∞ | | | |

Variable Thicknesses of Air Lenses

| | Focal Lengths | | |
|---|---|---|---|
| Air Lenses | W 1.00 | M 3.10 | T 11.41 |
| d 7 | 0.22 | 3.28 | 5.31 |
| d13 | 5.52 | 2.47 | 0.44 |
| d18 | 2.12 | 1.43 | 1.83 |
| d23 | 1.02 | 1.72 | 1.31 |

Embodiment 5
f = 1 to 11.41   fno = 1:1.65 to 1.79   2w = 66.3° to 6.6°

| | | | |
|---|---|---|---|
| r 1 = 17.4772 | d 1 = 0.3061 | n 1 = 1.84666 | v 1 = 23.8 |
| r 2 = 7.1092 | d 2 = 1.1085 | n 2 = 1.51633 | v 2 = 64.2 |
| r 3 = 28.3027 | d 3 = 0.0408 | | |
| r 4 = 17.5011 | d 4 = 0.6399 | n 3 = 1.72000 | v 3 = 50.3 |
| r 5 = −320.0273 | d 5 = 0.0408 | | |
| r 6 = 5.9532 | d 6 = 0.8736 | n 4 = 1.72000 | v 4 = 50.3 |
| r 7 = 19.3442 | d 7 = variable | | |
| r 8 = 13.4358 | d 8 = 0.1633 | n 5 = 1.77250 | v 5 = 49.6 |
| r 9 = 1.4947 | d 9 = 0.7873 | | |
| r10 = −4.2621 | d10 = 0.1429 | n 6 = 1.69680 | v 6 = 55.5 |
| r11 = 3.3615 | d11 = 0.2006 | | |
| r12 = 3.1714 | d12 = 0.3994 | n 7 = 1.84666 | v 7 = 23.8 |
| r13 = 23.9889 | d13 = variable | | |
| r14 = (stop) | d14 = 0.2449 | | |
| r15 = 4.3405 | d15 = 0.5579 | n 8 = 1.58267 | v 8 = 46.4 |
| r16 = −5.4173 | d16 = 0.1136 | | |
| r17 = −3.1313 | d17 = 0.2041 | n 9 = 1.68893 | v 9 = 31.1 |
| r18 = −5.1512 | d18 = variable | | |
| r19 = 3.9973 | d19 = 0.1633 | n10 = 1.84666 | v10 = 23.8 |
| r20 = 1.8419 | d20 = 0.5479 | n11 = 1.51633 | v11 = 64.2 |
| r21 = −14.6634 | d21 = 0.0306 | | |
| r22 = 3.9015 | d22 = 0.4193 | n12 = 1.48749 | v12 = 70.2 |
| r23 = −10.8455 | d23 = variable | | |
| r24 = ∞ | d24 = 1.0204 | n13 = 1.51633 | v13 = 64.2 |
| r25 = ∞ | | | |

Variable Thicknesses of Air Lenses

| | Focal Lengths | | |
|---|---|---|---|
| Air Lenses | W 1.00 | M 3.12 | T 11.40 |
| d 7 | 0.20 | 3.41 | 5.55 |
| d13 | 5.77 | 2.56 | 0.42 |
| d18 | 1.92 | 1.250 | 1.65 |
| d23 | 1.02 | 1.69 | 1.28 |

Embodiment 6
f = 1 to 11.41   fno = 1:1.66 to 1.76   2w = 66.3° to 6.6°

| | | | |
|---|---|---|---|
| r 1 = 14.8459 | d 1 = 0.3061 | n 1 = 1.84666 | v 1 = 23.8 |
| r 2 = 6.8670 | d 2 = 1.1213 | n 2 = 1.51633 | v 2 = 64.2 |
| r 3 = 25.7908 | d 3 = 0.0408 | | |
| r 4 = 14.1586 | d 4 = 0.5805 | n 3 = 1.72000 | v 3 = 50.3 |
| r 5 = 59.9705 | d 5 = 0.0408 | | |
| r 6 = 6.1766 | d 6 = 0.8523 | n 4 = 1.72000 | v 4 = 50.3 |
| r 7 = 20.3556 | d 7 = variable | | |
| r 8 = 10.6354 | d 8 = 0.1633 | n 5 = 1.77250 | v 5 = 49.6 |
| r 9 = 1.4762 | d 9 = 0.8341 | | |
| r10 = −4.4874 | d10 = 0.1429 | n 6 = 1.69680 | v 6 = 55.5 |
| r11 = 3.6681 | d11 = 0.1712 | | |
| r12 = 3.1466 | d12 = 0.4133 | n 7 = 1.84666 | v 7 = 23.8 |
| r13 = 17.8814 | d13 = variable | | |
| r14 = (stop) | d14 = 0.2449 | | |
| r15 = 5.6434 | d15 = 0.4931 | n 8 = 1.72000 | v 8 = 50.3 |
| r16 = −5.6434 | d16 = 0.1199 | | |
| r17 = −3.0359 | d17 = 0.2041 | n 9 = 1.68893 | v 9 = 31.1 |
| r18 = −4.5760 | d18 = variable | | |
| r19 = 3.8997 | d19 = 0.1633 | n10 = 1.84666 | v10 = 23.8 |
| r20 = 1.9223 | d20 = 0.5267 | n11 = 1.51633 | v11 = 64.2 |
| r21 = −17.5418 | d21 = 0.0306 | | |
| r22 = 4.2561 | d22 = 0.4404 | n12 = 1.48749 | v12 = 70.2 |
| r23 = −7.8729 | d23 = variable | | |
| r24 = ∞ | d24 = 1.0204 | n13 = 1.51633 | v13 = 64.2 |
| r25 = ∞ | | | |

Variable Thicknesses of Air Lenses

| | Focal Lengths | | |
|---|---|---|---|
| Air Lenses | W 1.00 | M 3.14 | T 11.40 |
| d 7 | 0.17 | 3.48 | 5.68 |
| d13 | 5.80 | 2.49 | 0.29 |
| d18 | 1.99 | 1.36 | 1.73 |
| d23 | 1.02 | 1.66 | 1.28 |

Embodiment 7
f = 1 to 12.01  fno = 1:1.70 to 1.83  2w = 65.8° to 6.2°

| | | | |
|---|---|---|---|
| r 1 = 13.8790 | d 1 = 0.302 | n 1 = 1.84666 | v 1 = 23.8 |
| r 2 = 6.6375 | d 2 = 1.1117 | n 2 = 1.51633 | v 2 = 64.2 |
| r 3 = 22.8527 | d 3 = 0.0404 | | |
| r 4 = 13.2082 | d 4 = 0.5740 | n 3 = 1.72000 | v 3 = 50.3 |
| r 5 = 46.7660 | d 5 = 0.0404 | | |
| r 6 = 6.1788 | d 6 = 0.8449 | n 4 = 1.72000 | v 4 = 50.3 |
| r 7 = 20.8885 | d 7 = variable | | |
| r 8 = 10.4085 | d 8 = 0.1617 | n 5 = 1.77250 | v 5 = 49.6 |
| r 9 = 1.4575 | d 9 = 0.8270 | | |
| r10 = −4.4828 | d10 = 0.1415 | n 6 = 1.69680 | v 6 = 55.5 |
| r11 = 3.5913 | d11 = 0.1698 | | |
| r12 = 3.1001 | d12 = 0.4042 | n 7 = 1.84666 | v 7 = 23.8 |
| r13 = 17.0862 | d13 = variable | | |
| r14 = (stop) | d14 = 0.2449 | | |
| r15 = 5.3231 | d15 = 0.4851 | n 8 = 1.72000 | v 8 = 50.3 |
| r16 = −5.3231 | d16 = 0.1067 | | |
| r17 = −3.0365 | d17 = 0.2021 | n 9 = 1.68893 | v 9 = 31.1 |
| r18 = −4.7119 | d18 = variable | | |
| r19 = 3.9957 | d19 = 0.1617 | n10 = 1.84666 | v10 = 23.8 |
| r20 = 1.9037 | d20 = 0.5215 | n11 = 1.51633 | v11 = 64.2 |
| r21 = −19.9577 | d21 = 0.0303 | | |
| r22 = 4.2388 | d22 = 0.4366 | n12 = 1.48749 | v12 = 70.2 |
| r23 = −7.9110 | d23 = variable | | |
| r24 = ∞ | d24 = 1.0106 | n13 = 1.51633 | v13 = 64.2 |
| r25 = ∞ | | | |

Variable Thicknesses of Air Lenses

| | Focal Lengths | | |
|---|---|---|---|
| Air Lenses | W | M | T |
| | 1.00 | 3.11 | 11.41 |
| d 7 | 0.16 | 3.48 | 5.69 |
| d13 | 5.81 | 2.49 | 0.27 |
| d18 | 1.94 | 1.26 | 1.73 |
| d23 | 1.01 | 1.69 | 1.22 |

Embodiment 8
f = 1 to 11.40  fno = 1:1.65 to 1.79  2w = 66.3° to 6.6°

| | | | |
|---|---|---|---|
| r 1 = 23.1696 | d 1 = 0.3061 | n 1 = 1.84666 | v 1 = 23.3 |
| r 2 = 7.7976 | d 2 = 0.9628 | n 2 = 1.51633 | v 2 = 64.2 |
| r 3 = 23.2595 | d 3 = 0.0408 | | |
| r 4 = 13.4142 | d 4 = 0.8380 | n 3 = 1.72000 | v 3 = 50.3 |
| r 5 = −61.4809 | d 5 = 0.0408 | | |
| r 6 = 5.8666 | d 6 = 0.7968 | n 4 = 1.72000 | v 4 = 50.3 |
| r 7 = 14.5960 | d 7 = variable | | |
| r 8 = 12.2119 | d 8 = 0.1633 | n 5 = 1.77250 | v 5 = 49.6 |
| r 9 = 1.5441 | d 9 = 0.7873 | | |
| r10 = −3.5821 | d10 = 0.1429 | n 6 = 1.69680 | v 6 = 55.5 |
| r11 = 3.5821 | d11 = 0.2724 | | |
| r12 = 3.6512 | d12 = 0.4921 | n 7 = 1.84666 | v 7 = 23.8 |
| r13 = 71.9571 | d13 = variable | | |
| r14 = (stop) | d14 = 0.2449 | | |
| r15 = 3.3555 aspherical | d15 = 0.6246 | n 8 = 1.58313 | v 8 = 59.4 |
| r16 = −8.2938 | d16 = 0.2370 | | |
| r17 = −2.4818 | d17 = 0.2041 | n 9 = 1.59551 | v 9 = 39.2 |
| r18 = −2.9772 | d18 = variable | | |
| r19 = 4.9603 | d19 = 0.1633 | n10 = 1.78472 | v10 = 25.7 |
| r20 = 1.7557 | d20 = 0.5777 | n11 = 1.51633 | v11 = 64.2 |
| r21 = −12.4206 | d21 = 0.0306 | | |
| r22 = 3.9947 | d22 = 0.3996 | n12 = 1.51633 | v12 = 64.2 |
| r23 = −12.9695 | d23 = variable | | |
| r24 = ∞ | d24 = 1.0204 | n13 = 1.51633 | v13 = 64.2 |
| r25 = ∞ | | | |

Variable Thicknesses of Air Lenses

| | Focal Lengths | | |
|---|---|---|---|
| Air Lenses | W | M | T |
| | 1.00 | 3.10 | 11.40 |
| d 7 | 0.21 | 3.43 | 5.58 |
| d13 | 5.81 | 2.59 | 0.45 |
| d18 | 1.61 | 0.90 | 1.31 |
| d23 | 1.02 | 1.71 | 1.31 |

In surface r15, the coefficients of the aspherical surface are: $a_1=0.00000D_{+00}$, $a_2=2.52796D_{-03}$, $a_3=2.98987D_{-04}$, $a_4=4.75191D_{-04}$, $a_5=-1.59625D_{-04}$.

TABLE 1

| Conditional Expressions | Embodiments | | | | | | | |
|---|---|---|---|---|---|---|---|---|
| | 1 | 2 | 3 | 4 | 5 | 6 | 7 | 8 |
| $|M_2/f_2|$ | 3.46 | 3.41 | 3.22 | 3.23 | 3.22 | 3.22 | 3.28 | 3.23 |
| $f_4/f_w$ | 4.48 | 4.42 | 4.28 | 4.31 | 4.11 | 4.28 | 4.28 | 4.71 |
| $f_1/f_w$ | 10.99 | 10.01 | 8.39 | 8.43 | 8.84 | 9.15 | 9.10 | 8.82 |
| $|f_1/f_2|$ | 6.14 | 5.89 | 5.34 | 5.36 | 5.33 | 5.35 | 5.39 | 5.32 |
| $|f_2/f_w|$ | 1.79 | 1.70 | 1.57 | 1.57 | 1.66 | 1.71 | 1.69 | 1.66 |
| $f_1/M_2$ | 1.77 | 1.72 | 1.66 | 1.66 | 1.65 | 1.66 | 1.64 | 1.65 |
| $Z/Z_2$ | 1.39 | 1.33 | 1.16 | 1.16 | 1.16 | 1.17 | 1.13 | 1.17 |
| $Z_3/Z_4$ | 3.40 | 3.22 | 1.91 | 1.89 | 1.76 | 1.97 | 1.56 | 1.64 |

Constructed as above, the zoom lens systems according to the preferred embodiments of the present invention achieve reduced sizes thereof and wide view angles of 65° or greater.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A rear-focus zoom lens system comprising:

a first lens group having a positive refractive power that remains fixed during zooming;

a second lens group having a negative refractive power that moves for zooming;

a third lens group having a positive refractive power that remains fixed in position during zooming; and a fourth lens group having a positive refractive power that moves for zooming and focusing, said first through fourth lens groups being arranged in that order from the object side, wherein said zoom lens system satisfies the following conditional expression:

$4<f_4/f_w<6$, wherein $f_4$ is the focal length of the fourth lens group and $f_w$ is the focal length of said zoom lens system at a wide-angle end, and further satisfying the following conditional expression:

$7<f_1/f_w<15$ wherein, $f_1$ is the focal length of said first lens group and $f_w$ is the focal length of said zoom lens system at the wide-angle end.

2. A rear-focus zoom lens system according to claim 1, further satisfying the following conditional expression:

$$2.8<|M_2/f_2|<5$$

wherein, $M_2$ is a displacement of said second lens group when the zoom lens system moves from the wide-angle end toward the telephoto end; and $f_2$ is the focal length of said second lens group.

3. A rear-focus zoom lens system according to claim 2, further satisfying the following conditional expression:

$$8<|f_1/f_w|<12$$

wherein $f_1$ is the focal length of said first lens group and $f_w$ is the focal length of said zoom lens system at the wide-angle end.

4. A rear-focus zoom lens system according to claim 1, further satisfying the following conditional expression:

$$4.0<|f_1/f_2|<10.0$$

wherein $f_1$ is the focal length of said first lens group and $f_2$ is the focal length of said second lens group.

5. A rear-focus zoom lens system according to claim 1, further satisfying the following conditional expression:

$$1.55<|f_1/f_w|<1.8$$

wherein $f_1$ is the focal length of said first lens group and $f_w$ is the focal length of said zoom lens system at the wide-angle end.

6. A rear-focus zoom lens system according to claim 1, further satisfying the following conditional expression:

$$1.0<f_1/M_2<1.85$$

wherein $f_1$ is the focal length of said first lens group and $M_2$ is a displacement of said second lens group when the zoom lens system moves from the wide-angle end toward the telephoto end.

7. A rear-focus zoom lens system according to claim 1, further satisfying the following conditional expression:

$$1.0<z/z_2<1.5$$

wherein $z$ is the ratio between the focal length of the entire lens system at the wide-angle end and the focal length of the entire lens system at the telephoto end, and $z_2$ is the ratio between the magnifications at the wide-angle end and the telephone end in said second lens group.

8. A rear-focus zoom lens system according to claim 1, further satisfying the following conditional expression:

$$1.65<z_3/z_4<4.0$$

wherein $z_3$ is the ratio between the magnifications at the wide-angle end and the telephoto end in said third lens group, and $z_4$ is the ratio between the magnifications at the wide-angle end and the telephoto end in said fourth lens group.

9. A rear-focus zoom lens system according to claim 1, wherein said first lens group comprises, from the object side, a combined lens, which consists of a negative lens and a positive lens, and at least one positive lens.

10. A rear-focus zoom lens system according to claim 1, wherein said second lens group comprises, from the object side, a negative meniscus lens having a substantially concave surface toward the image side, a biconcave lens, and a positive lens having a concave surface toward the image side.

11. A rear-focus zoom lens system according to claim 1, wherein said third lens group comprises, from the object side, a biconvex positive lens having an aspherical surface and a negative lens having a concave surface toward the object side.

12. A rear-focus zoom lens system according to claim 1, wherein said fourth lens group comprises, from the object side, a negative meniscus lens concave toward the image side, and at least one positive lens.

13. A rear-focus zoom lens system according to claim 1, wherein said zoom lens system satisfies the following conditional expression:

$$4.11<f_4/fw<6,$$

wherein $f_4$ is the focal length of the fourth lens group and $fw$ is the focal length of said zoom lens system at a wide-angle end.

14. A rear-focus zoom lens system comprising:

a first lens group having a positive refractive power that remains fixed during zooming;

a second lens group having a negative refractive power that moves for zooming;

a third lens group having a positive refractive power that remains fixed in position during zooming;

a fourth lens group having a positive refractive power that moves for zooming and focusing, said first through fourth lens groups being arranged in that order from the object side, wherein said zoom lens system satisfies the following conditional expression:

$$4<f_4/fw<6,$$

wherein $f_4$ is the focal length of the fourth lens group and $fw$ is the focal length of said zoom lens system at a wide-angle end; and wherein said zoom lens system further satisfies the following conditional expression:

$$2.8<|M_2/f_2|<5$$

wherein, $M_2$ is a displacement of said second lens group when the zoom lens system moves from the wide-angle end toward the telephoto end, and $f_2$ is the focal length of said second lens group.

* * * * *

UNITED STATES PATENT AND TRADEMARK OFFICE
CERTIFICATE OF CORRECTION

PATENT NO. : 5,583,699
DATED : December 10, 1996
INVENTOR(S) : HIROKI NAKAYAMA

It is certified that error appears in the above-indentified patent and that said Letters Patent is hereby corrected as shown below:

On the title page, item:

[56] References Cited:

FOREIGN PATENT DOCUMENTS

"87024213" should read --62-24213--.

[57] ABSTRACT:

Line 3, "group." should read --groups.--.

COLUMN 4:

Line 3, "positive lens" should read --positive lenses--.

COLUMN 5:

Line 37, "$a_3Y^{16}$" should read --$a_3Y^6$--.

Signed and Sealed this

Fifteenth Day of July, 1997

Attest:

BRUCE LEHMAN

*Attesting Officer*      *Commissioner of Patents and Trademarks*